Patented Aug. 16, 1949

2,479,513

UNITED STATES PATENT OFFICE 2,479,513

LUBRICATING OIL

Frederick P. Richter and Everett W. Fuller, Woodbury, N. J., assignors to Socony-Vacuum Oil Company, Incorporated, a corporation of New York No Drawing. Application April 5, 1947, Serial No. 739,650

9 Claims. (Cl. 252—48.2)

This invention relates to lubricating compositions, and particularly to lubricating compositions improved by incorporating therein a small proportion sufficient to improve the properties thereof of one or more materials of the class consisting of mono- and poly-hydroxydibenzothiophenes and alkyl-substituted mono- and poly-hydroxydibenzothiophenes.

This invention also includes a method for the preparation of poly-hydroxydibenzothiophenes and alkyl-substituted mono- and poly-hydroxydibenzothiophenes and the products so prepared.

Prior to this invention, 2-hydroxydibenzothiophene and its preparation were described in German Patent 606,350, Example 2, November 30, 1934. Insofar as is known, no method has been previously disclosed for the manufacture of any other mono- or poly-hydroxydibenzothiophene, nor has any method been disclosed for the preparation of alkyl-substituted mono- and poly-hydroxydibenzothiophenes. Therefore, of course, the compounds themselves have not been previously disclosed.

According to this invention, it has been discovered that dibenzothiophene can be halogenated by means of chlorine or bromine with or without a catalyst, to produce di- or poly-halogenated dibenzothiophene and the halogenated dibenzothiophene so produced can be hydrolyzed by treating it with an alkali or alkaline earth hydroxide such as barium hydroxide octahydrate, and thereafter acidifying with a mineral acid. Suitable catalysts such as copper or copper-bronze powder may be used to aid in the reaction of the hydroxide with the halogenated product. The result is a di- or poly-hydroxydibenzothiophene.

It has further been discovered that the mono-hydroxydibenzothiophene, and also di- or poly-hydroxydibenzothiophene produced as mentioned hereinbefore can be alkylated, for example, by reacting them with an anhydrous alcohol in the presence of an anhydrous metal halide, such as zinc chloride, or by subjecting them to a Friedel-Crafts type of reaction with an alkyl halide in the presence of a catalyst such as aluminum chloride or boron trifluoride.

Still further, it has been discovered that mono-, di- and poly-hydroxydibenzothiophenes and the alkyl-substituted mono-, di- and poly-hydroxydibenzothiophenes will all act, when incorporated in lubricating compositions, to inhibit deterioration and the tendency to oxidize of the lubricating compositions.

Reactants

The compositions of this invention may be prepared by using as a starting material chemically pure dibenzothiophene, or a crude product which contains a major proportion of dibenzothiophene. This starting material may be halogenated, preferably brominated, to an extent sufficient to replace as many of the hydrogen atoms with halogen as desired. Alternatively, the process may start with an already halogenated dibenzothiophene.

It appears that when only one hydrogen in each molecule of dibenzothiophene is replaced by the halogen, the halogen is usually inserted in the 2-position, and that when two hydrogens are replaced by halogens, that the halogens are usually inserted in the 2- and 8- positions. Therefore, 2-halodibenzothiophene and 2,8-dihalodibenzothiophene may be considered to be preferred examples of compounds formed by the first reaction in the process, or as compounds with which to begin the preparation of the compositions of this invention.

Barium hydroxide octahydrate may be considered as a preferred example of an alkali or alkaline earth hydroxide with which to convert the halodibenzothiophene into an hydroxydibenzothiophene. Any alkali or alkaline earth hydroxide will perform this function. Other examples of such bases are sodium hydroxide, potassium hydroxide, calcium hydroxide, strontium hydroxide, etc.

Copper powder may be considered as a preferred example of a catalyst which may be used to assist in the reaction of the hydroxide with the halodibenzothiophene. Any other similarly acting catalyst, such as copper-bronze powder, silver powder, precipitated copper, electrolytic copper, etc., may be used for this purpose.

If the hydroxydibenzothiophene is to be alkylated, this may be accomplished by the use of an aliphatic alcohol, preferably a tertiary alcohol. Tertiary amyl alcohol may be considered to be a preferred example. Cycloaliphatic alcohols and aliphatic alcohols having other than aliphatic substituents may also be used.

Halides corresponding to the alcohols mentioned above, olefins, and other compounds that contain an alkyl chain and will condense with aromatics to alkylate them may be used in place of the alcohols described above.

The alkylation may be catalyzed by anhydrous zinc chloride, which has been found preferable, or by any other alkylation catalyst. Aluminum chloride, boron trifluoride and hydrogen fluoride are examples of such catalysts.

Reaction conditions

The halogenation of the dibenzothiophene may be accomplished by subjecting the dibenzothiophene to the desired halogen in an amount sufficient to halogenate the dibenzothiophene to the desired extent, at temperatures ranging from about 100° C. to about 300° C. and at pressures ranging from atmospheric to about 100 pounds per square inch. It is preferable, although not necessary, to carry out the halogenation in the presence of a catalyst, such as iron powder. Excess halogen may be blown out by an inert gas after the reaction has completed itself, or distilled off from the final product.

The halodibenzothiophene is converted into hydroxydibenzothiophene by treatment with the hydroxide, preferably, but not necessarily, in the presence of a catalyst, usually in the presence of an excess of water and usually at an elevated temperature. By utilizing pressure to prevent the vaporization of water, a temperature of about 220–275° C., and preferably a temperature of about 240–260° C., can be used, at which temperature the reaction will complete itself in 24 hours or less when using barium hydroxide octahydrate and copper powder.

In general, it is preferred to use an excess of the hydroxide over the amount theoretically required. This excess may be from 1 to 5 times the amount theoretically required. Preferably also, an amount of catalyst equal to about 3 to 6% of the total charge will be used, although the reaction can be accomplished in the complete absence of a catalyst, if desired.

Barium hydroxide octahydrate is preferred because it causes no carbonization, and copper or copper-bronze powder is preferred as a catalyst. The reaction may be accomplished either with or without agitation.

The resulting solution is preferably filtered and the filtrate acidified with a dilute mineral acid, such as hydrochloric acid, to liberate the hydroxy derivative. The crude product so produced may then be crystallized from dilute alcohol to purify it.

In order to obtain the alkylated product, the mono-, di- or poly-hydroxydibenzothiophene may be reacted with a sufficient quantity of anhydrous alcohol in the presence of an anhydrous alkylation catalyst such as zinc chloride. This is preferably accomplished by stirring the reactants and catalyst together at a temperature ranging from about 165° C. to about 185° C. for from about 6 to about 10 hours in the presence of anhydrous (fused) zinc chloride in a ratio of 1.25 to 4 times the amount of hydroxydibenzothiophene used. It is desirable, although not strictly essential, to distill off and trap the water formed in the reaction. At least one mole of alcohol should be employed per mole of hydroxydibenzothiophene and if higher alkylation products are desired, ratios up to about 2.5 moles of alcohol may be employed per mole of hydroxydibenzothiophene. Higher ratios are not recommended for use at atmospheric pressure since it then becomes difficult to operate in the preferred temperature range. Thereafter, the product is freed from the catalyst and other water-soluble impurities by dissolving it in benzene or an equivalent organic solvent, washing with water, drying and removing the solvent by distillation.

Oil base

The hydroxydibenzothiophenes and alkylated hydroxydibenzothiophenes described above have been found particularly useful as ingredients in lubricating compositions, where they materially reduce the tendency of the composition to deteriorate and oxidize.

These materials may be incorporated in any lubricating composition ranging from gasoline and kerosene to heavy gear oil, petroleum wax and petrolatum. They may also be used with similar lubricating compositions derived from other animal, mineral or vegetable sources, or prepared synthetically. Such lubricating compositions may contain any other desired addition agent or combination of addition agents, which may be added for the purpose of effecting the same improvement or other improvements in that composition.

Ordinarily, the new compositions described above will be added to lubricating compositions in amounts ranging from 0.01% or less to 1.0% but may be added in amounts up to 10%, in some instances. Those of the new products that are sufficiently soluble in oil may be marketed in the form of oil concentrates in which the per cent of the new products is greatly in excess of that which is desired in the final lubricating composition, for example, quantities up to 50% by weight.

Further details and advantages of this invention will be apparent from a consideration of the following specific examples and results of tests.

*Example I.—(2,8-dihydroxydibenzothiophene)*

A mixture of:

|  | Parts |
| --- | --- |
| 2,8-dibromodibenzothiophene | 25.7 |
| Barium hydroxide octahydrate | 94.5 |
| Copper powder | 15.0 |
| Water | 175.0 | was heated under pressure at 240° C. to 260° C. for 24 hours. The reaction product was extracted several times with boiling water, the solution filtered and the filtrate acidified with dilute hydrochloric acid. The precipitated crude 2,8-dihydroxydibenzothiophene was crystallized from dilute ethanol and yielded 13.2 parts (82% yield) of a white crystalline product. A portion recrystallized from dilute methanol melted at 278° C. to 279° C. (uncorr.). It was found to contain 14.76% sulfur. The calculated percentage of sulfur for 2,8-dihydroxydibenzothiophene is 14.83%.

A saturated oil solution of 2,8-dihydroxydibenzothiophene was prepared using as the oil a highly refined mineral oil suitable for use in transformers and prepared by treating a Coastal distillate with 40 lbs. of 98% sulfuric acid and 180 lbs. of 103% oleum per barrel followed by washing and clay percolation. This oil had the following physical properties: specific gravity 0.871, flash point 310° F., Saybolt Universal viscosity 60 sec. at 100° F. It is characteristic of this type of oil to produce acidic products on oxidation. The blank oil and the oil containing 2,8-dihydroxydibenzothiophene dissolved therein were tested by heating the samples at 120° C. and bubbling oxygen through the heated oil for a period of 70 hours. The acids thus formed were titrated with alcoholic potassium hydroxide, the results being expressed as the neutralization number which represents the number of milligrams of potassium hydroxide required to neutralize the acidic bodies contained in one gram of the test oil. That the dihydroxydibenzothiophene materially improves the stability of the petroleum oil toward oxidation at an elevated temperature is shown by the following data:

| After 70 hours | N.N. |
| --- | --- |
| Blank oil | 20.0 |
| The same oil saturated with 2,8-dihydroxydibenzothiophene, the amount dissolved being less than 0.01% | 6.7 |

The oil blend did not contain suspended dihydroxydibenzothiophene since it was carefully filtered through a filtering clay prior to testing.

Example II

Because of the low solubility of 2-hydroxy- and 2,8-dihydroxy-dibenzothiophene in petroleum oils it appeared desirable to improve the solubility by alkylation. This is illustrated in the following example for the preparation of a tertiary amyl 2-hydroxydibenzothiophene. The exact location of the tertiary amyl group in the dibenzothiophene nucleus is not known with certainty but it is believed to be in the 3 position. Isomeric alkylation products are formed simultaneously.

Mass relations:

|  | Parts |
|---|---|
| 2-hydroxydibenzothiophene (M. P. 159° C.) | 100 |
| Anhydrous tertiary amyl alcohol | 44.1 |
| Anhydrous (fused) zinc chloride | 136.3 |

The 2-hydroxydibenzothiophene and zinc chloride were placed in a reaction vessel which was equipped with a mechanical stirrer, water cooled condenser and thermometer dipping into the liquid. The tertiary amyl alcohol was added rapidly with constant stirring and the temperature was raised to 180° C. and held at 175–185° C. until the reaction was complete, about 6 hours. The product was freed of zinc chloride and other water soluble impurities by dissolving the crude material in benzene, washing with water, drying and removing the benzene by distillation under vacuum. The residue consisting of alkylated 2-hydroxydibenzothiophene could not be readily recrystallized from a solvent because it contained isomeric tertiary amyl derivatives. The identity was established, however, by analysis. Calculated for $C_{17}H_{19}OS$: $S = 11.9\%$; found: $S = 12.2\%$. Calculated for $C_{17}H_{18}S(OH)$: Hydroxyl number = 207. Found: hydroxyl number = 223.

The tertiary amyl hydroxydibenzothiophene prepared above was found to be considerably more soluble in petroleum oils than the 2-hydroxydibenzothiophene from which it was prepared. An 0.5% solution in the test oil described in Example I was prepared and tested according to the method described in Example I. The neutralization number of the treated oil at the end of the test was only 0.02 mg. KOH/g. of oil indicating that the tertiary amyl hydroxydibenzothiophene had greatly stabilized the oil toward oxidation. Further tests were made in order to evaluate the oxidation inhibiting effect of the alkylated hydroxydibenzothiophene. The oils used in these tests were: (A) a moderately refined oil which was a mixed Mid-Continent and Coastal distillate which had been refined by treatment with 70 pounds of 98% sulfuric acid per barrel, neutralized, washed and percolated through clay. It had a specific gravity of 0.879, a flash point of 385° F. and a Saybolt Universal viscosity of 152 seconds at 100° F. It is an oil suitable for use in turbines. (B) a solvent-refined oil that consisted of a distillate from a Rodessa crude which had been refined with furfural, dewaxed, and filtered. It had a specific gravity of 0.846, a flash point of 420° F. and a Saybolt Universal viscosity of 151 seconds at 100° F.

Test I

The test involved maintaining a 25 cc. sample of the oil or oil blend at a temperature of 200° F. with 5 liters of air per hour bubbling therethrough. Each sample contained 24 inches of No. 18 gauge copper wire and one gram of iron granules and 2 cc. of distilled water were added each day. The samples were tested after varying intervals for acidity, color and sludge, and the results for the blank oil and the blends containing the additive are as follows:

| Test Sample | Time | Lovibond Color | N. N. | Sludge |
|---|---|---|---|---|
|  | Hours |  |  | Mg. |
| 0.2% tertiary amyl hydroxydibenzothiphene in Oil A | 168 | 36.0 | 0.22 | 2 |
| Do | 312 | 45.0 | 0.30 | 5 |
| Oil A uninhibited | 168 | 25.0 | 0.99 | 17 |
| Do | 240 | 110.0 | 2.5 | 246 |
| Do | 336 | 400.0 | 16.0 | 1,282 |
| 0.2% tertiary amyl hydroxydibenzothiophene in Oil B | 168 | 33.0 | 0.26 | 2 |
| Do | 240 | 30.0 | 2.60 | 46 |
| Oil B uninhibited | 166 | 50.0 | 8.3 | 59 |

Test II

The oil used in this test was a solvent-refined S. A. E. 20 grade motor oil which is normally corrosive to bearing metals having the corrosion-susceptibility of cadmium-silver alloys. The oil was tested by placing a section of a bearing containing a cadmium-silver alloy surface and weighing about 6 g. in a sample of the oil or oil blend and heating the oil sample to a temperature of 175° C. for a period of 22 hours while bubbling a stream of air therethrough against the surface of the bearing. The loss in weight of the bearing as a result of this treatment measures the amount of corrosion that has taken place. A sample of the oil containing the addition agent is run simultaneously with a blank and the loss in weight of the bearing section in the inhibited oil can thus be compared directly with the loss in weight of the bearing section in the blank. The results are as follows:

| Test Sample | Loss in Milligrams |
|---|---|
| 1% tert-amylhydroxydibenzothiophene in the oil described | zero |
| 0.5% tert-amylhydroxydibenzothiophene in the oil described | zero |
| Blank oil | 22 |

These data show that the alkylated hydroxydibenzothiophene is particularly effective in preventing or retarding the corrosion of the bearing metal surface under oxidizing conditions and at elevated temperatures.

What is claimed is:

1. A mineral lubricating oil containing a small proportion sufficient to improve the stability thereof, of an hydroxydibenzothiophene.

2. A mineral lubricating oil containing a small proportion sufficient to improve the stability thereof, of an alkyl-substituted hydroxydibenzothiophene.

3. A mineral lubricating oil containing a small proportion sufficient to improve the stability thereof, of a polyhydroxydibenzothiophene.

4. A mineral lubricating oil containing a small proportion sufficient to improve the stability thereof, of a dihydroxydibenzothiophene.

5. A mineral lubricating oil containing a small proportion sufficient to improve the stability thereof, of an alkyl-substituted polyhydroxydibenzothiophene.

6. A mineral lubricating oil containing a small proportion sufficient to improve the stability thereof, of an alkyl-substituted dihydroxydibenzothiophene.

7. A mineral lubricating oil containing a small proportion sufficient to improve the stability thereof but less than 10%, of an hydroxydibenzothiophene.

8. A mineral lubricating oil containing between about 0.01% and 1.0% of an hydroxydibenzothiophene.

9. A mineral lubricating oil concentrate containing in excess of 10% of an hydroxydibenzothiophene, which concentrate is adapted to be blended with a mineral lubricating oil in such proportions as to produce a mineral lubricating oil containing between about 0.01% and 10.0% of an hydroxydibenzothiophene.

FREDERICK P. RICHTER.
EVERETT W. FULLER.

REFERENCES CITED

The following references are of record in the file of this patent:

UNITED STATES PATENTS

| Number | Name | Date |
|---|---|---|
| 1,997,744 | Pützer et al. | Apr. 16, 1935 |
| 2,157,796 | Muth | May 9, 1939 |
| 2,160,293 | Shoemaker | May 30, 1939 |